UNITED STATES PATENT OFFICE.

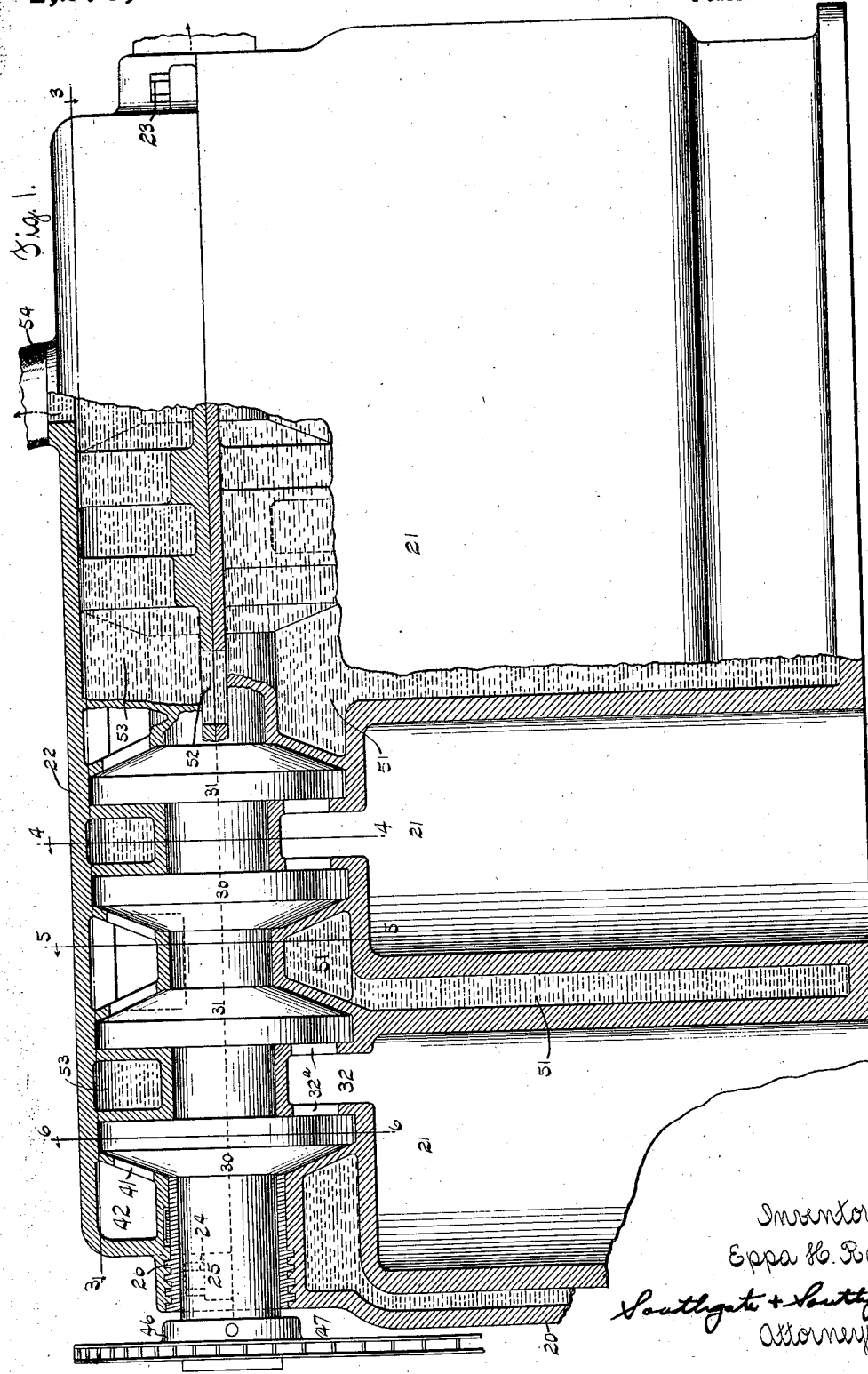

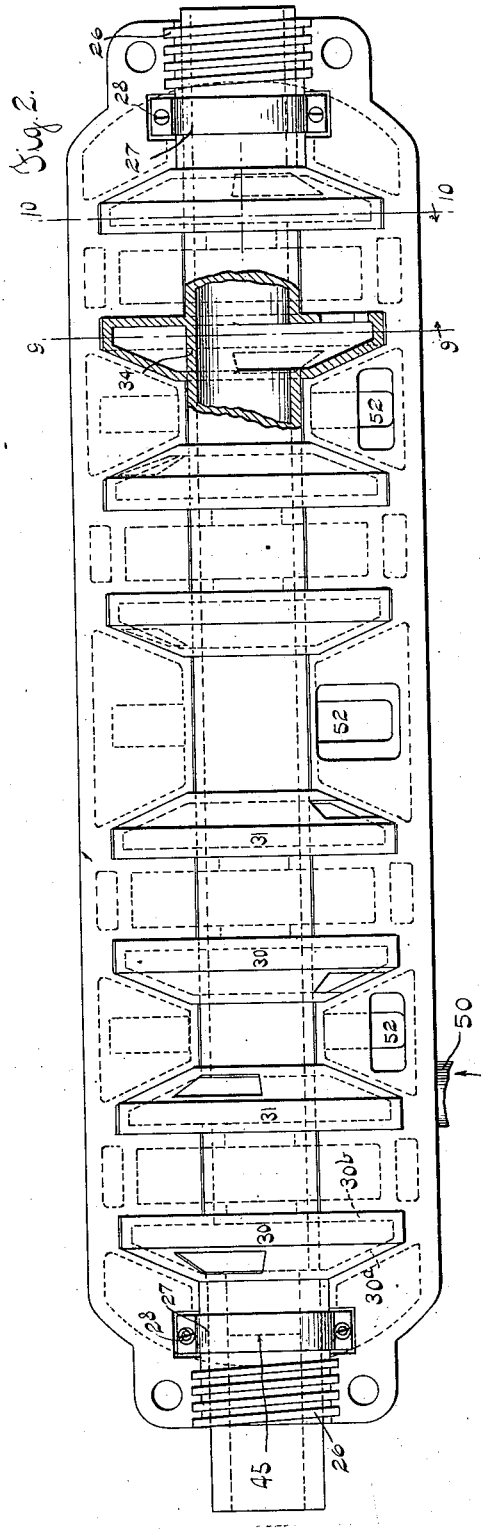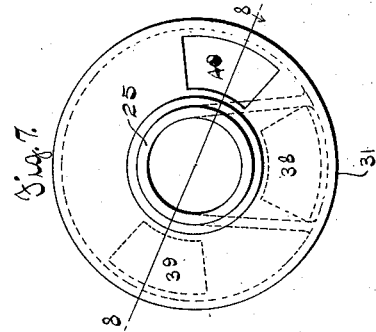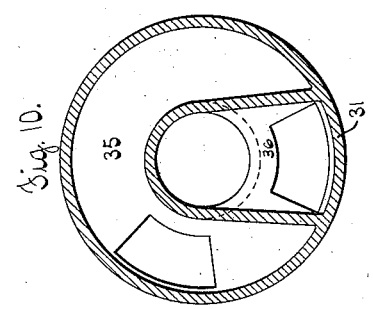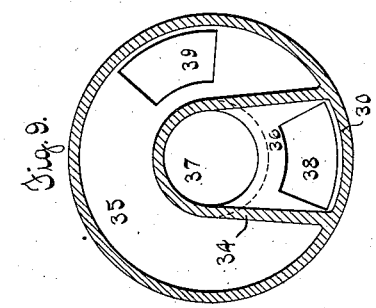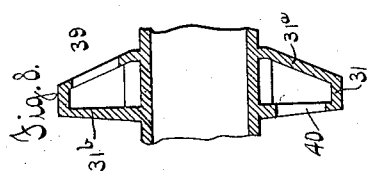

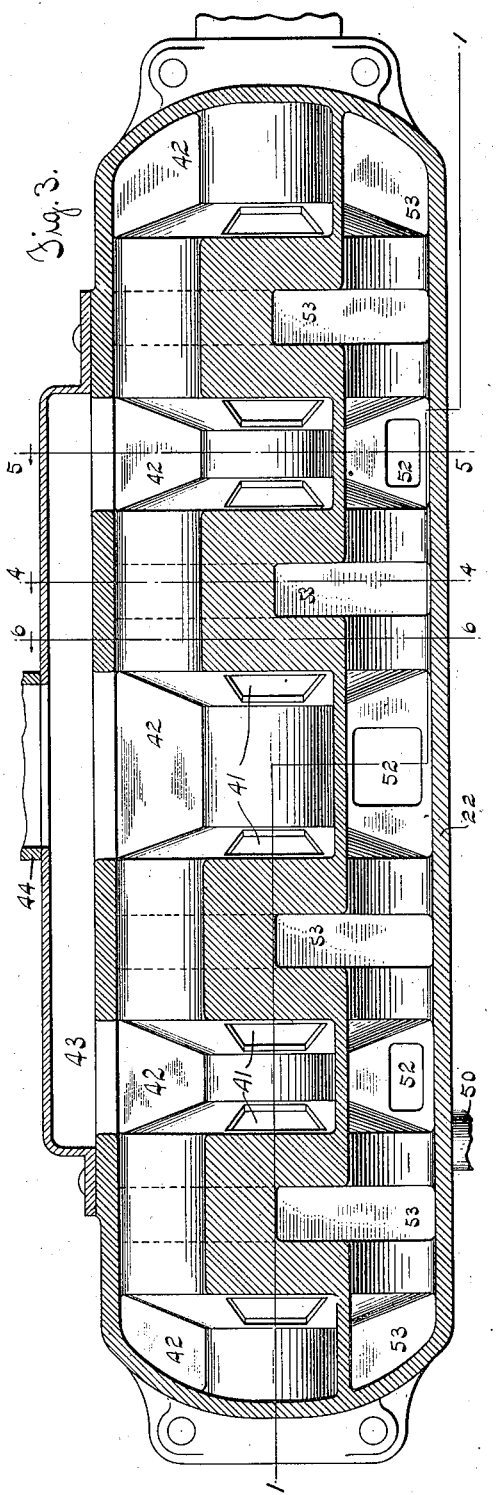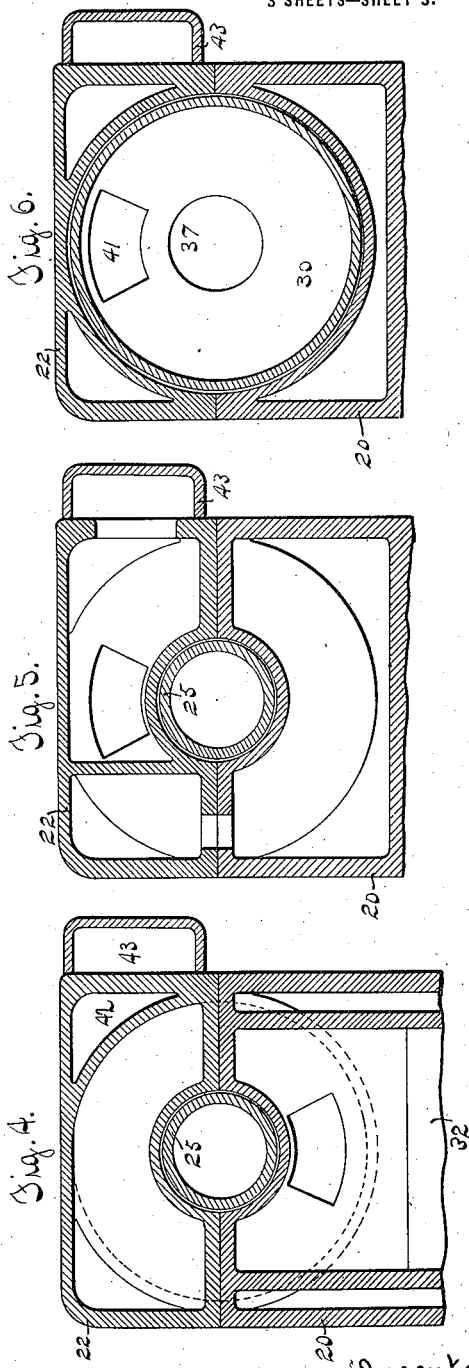

EPPA H. RYON, OF WALTHAM, MASSACHUSETTS.

VALVE MECHANISM.

1,275,093.  Specification of Letters Patent.  Patented Aug. 6, 1918.

Application filed July 27, 1916. Serial No. 111,733.

*To all whom it may concern:*

Be it known that I, EPPA H. RYON, a citizen of the United States, residing at Waltham, in the county of Middlesex and State of Massachusetts, have invented a new and useful Valve Mechanism, of which the following is a specification.

This invention relates to a valve mechanism particularly designed for use in an internal combustion engine. Somewhat similar mechanism is shown in my co-pending application Serial No. 804,636, filed December 4, 1913, and it is the object of my present invention to improve the construction of valve mechanism of the type therein shown, to the end that it may be more easily manufactured and that its efficiency in operation may be increased.

To the attainment of this object, one feature of my invention relates to the provision of a hollow shaft upon which a plurality of hollow disk valves are mounted, the shaft providing a passage for the escape of exhaust gases. Another feature of my invention relates to the provision of a partition within each disk valve, separating each valve into two compartments, one of said compartments forming the connection between an exhaust port and the hollow shaft, and the other compartment forming a part of the intake passage for the fuel supply.

An important feature of construction resides in the formation of the valves with outwardly converging faces whereby they may be seated by grinding, and a close fit may be readily obtained. I have also improved and extended the water-circulating system, whereby the parts are more effectively cooled.

Further features of my invention relate to certain arrangements and combinations of parts which will be hereinafter described and more particularly pointed out in the appended claims.

A preferred form of my invention is shown in the drawings in which—

Figure 1 is a side elevation partly in section taken along the line 1—1 in Fig. 3;

Fig. 2 is a top plan view of the valve mechanism with the cap removed;

Fig. 3 is a horizontal sectional view taken along the line 3—3 in Fig. 1;

Figs. 4, 5 and 6 are vertical transverse sectional views taken along the lines 4—4, 5—5, and 6—6 respectively in Figs. 1 or 3;

Fig. 7 is a front elevation of one of the disk valves;

Fig. 8 is a sectional view of the valve taken along the line 8—8 in Fig. 7;

Fig. 9 is a sectional elevation of a valve taken along the line 9—9 in Fig. 2, and Fig. 10 is a similar view taken along the line 10—10 in Fig. 2.

In the drawings, I have shown my improved valve mechanism mounted in an internal combustion engine having a frame casting 20 with cylinders 21—21 formed therein, and having a cap 22 secured thereto in any convenient manner, as by bolts 23 and 24 (Fig. 1). A hollow shaft 25 is mounted in bearings each comprising a sleeve 26 threaded into the outer ends of the casting 20 and cap 22, as clearly shown in Figs. 1 and 2. Angular adjustment of these sleeve bearings regulates the end play of the hollow shaft and prevents leakage, and the adjustment is retained by means of straps 27 (Fig. 2) which are tightened upon the bearings by screws 28 to secure them in adjusted position.

A series of disk valves are supported by the hollow shaft 25, and preferably are formed integrally therewith. These valves are formed in oppositely disposed pairs, each pair comprising a valve 30 and a valve 31 positioned on opposite sides of a passage 32 opening out of one of the cylinders 21.

These disk valves are hollow, and the interior construction of one of the valves 31 is shown in Figs. 7, 8 and 10. One of the end walls 31ᵃ of the valve is inclined at a substantial angle to the axis, and forms a frustum of a low cone. The other end wall 31ᵇ is also preferably slightly crowned outwardly so that the two end walls converge toward their peripheries, as clearly shown in Fig. 8, in which the angle of the second wall is magnified for purposes of illustration. The angle of this wall is in practice very slight, and is not noticeable in the drawings except when magnified as in Fig. 8. Even this slight angle, however, possesses important advantages in construction as by its use I am able to grind the valve into place and accurately fit it in its seat, a method of procedure which is not possible with the cylindrical valve shown in my prior application. The structure of the valve 30 (Fig. 9) is substantially the same.

The interior of each valve is divided by a partition 34 into two compartments 35 and 36. The compartment 36 communicates at one end with the passage 37 which extends through the hollow shaft 25, and the compartment is also provided with an opening 38 which at times coincides with one of the openings 32ª (Fig. 1) leading from the passage 32 and the cylinder 21.

The compartment 35 of each hollow disk valve is provided with an opening 39 in its inclined wall 30ª or 31ª and with an opening 40 in its substantially flat wall 30ᵇ or 31ᵇ. The opening 40 at times coincides with one of the openings 32ª above referred to and at that time the corresponding opening 39 coincides with an opening 41 (Fig. 1) formed in the cap 22 and leading to the fuel passage 42, manifold 43 and intake 44 (Fig. 3).

A pair of valves 30 and 31 are provided for each cylinder so that there are two exhaust passages simultaneously opened for the removal of the exhaust gases, and there are two inlet passages simultaneously opened for the admission of the fresh fuel supply. The speed of operation of the gas exchange is materially increased by the provision of duplicate passages for the movement of the gas in each direction. Furthermore the opposed valves 30 and 31 are exactly balanced against the heavy pressures occurring in the cylinder 21.

The shaft 25 is closed at one end as by a plug 45 (Fig. 2), and may be provided with a sprocket 46 and chain 47 by which it may be connected to any convenient rotating part by which it will be driven in timed relation to the rotation of the engine crank shaft. As commonly arranged the shaft 25 will make one revolution to each two revolutions of the crank shaft.

Particular attention has been given to the water-jacketing of the valve mechanism, and all space not actually occupied by the valves or the intake passages is utilized as a part of the circulating system. The valves are thus almost continuously in contact upon one face or the other with a water-cooled surface, and excessive heating of the valves is avoided. Water may enter through the inlet pipe 50 (Fig. 2), passing through the jacket spaces 51 of the casting 20, thence through the passages 52 to the jacket spaces 53 in the cap 22 and out through the discharge pipe 54.

Having thus described my invention it will be evident that changes and modifications can be made therein by those skilled in the art without departing from the spirit and scope thereof as set forth in the claims, and I do not wish to be otherwise limited to the details herein disclosed, but what I claim is:—

1. In a valve mechanism, a hollow shaft having a series of hollow disk valves mounted thereon each formed of two separate compartments, one of said compartments having a single external opening and communicating with said hollow shaft, and the other having two external openings formed in the opposite end walls of said valve and out of alinement with each other.

2. A valve mechanism comprising a hollow shaft having a series of disk valves mounted thereon, and a casing for said shaft and valves, each valve having a continuous and unbroken peripheral surface and the interior of each valve being divided into two entirely separate compartments, one compartment communicating with an exhaust passage through said hollow shaft, and having an opening alined at times with an opening leading to and from the engine cylinder, and the second compartment substantially inclosing said first compartment and having openings in the opposite end walls of said valve periodically alined respectively with an opening to the fuel supply, and said opening to the engine cylinder.

3. A valve mechanism comprising a casting and a cap forming a casing, a hollow shaft supported in bearings by said casting and cap, and a plurality of hollow disk valves mounted on said shaft, said casting having a water jacket space, and said cap being divided into a passage for gaseous fuel and a jacket space for circulating water, the jacket spaces in said casting and cap communicating directly with each other and being contained entirely within said casing.

4. In a gas engine, a plurality of cylinders, a casing having a gas intake passage therein and having also a connection to each of said cylinders, and a pair of rotating disk valves for each cylinder mounted on opposite sides of the connection to said cylinder, said valves being mounted to rotate together and having a common axial exhaust passage, each valve alternately connecting said intake passage and said axial exhaust passage to its respective cylinder connection and being thus alternately effective as an intake valve and as an exhaust valve, the two valves in each pair being reversely mounted but coöperating simultaneously as intake or as exhaust valves.

In testimony whereof I have hereunto affixed my signature.

EPPA H. RYON.